(12) United States Patent
Murari et al.

(10) Patent No.: US 11,934,081 B2
(45) Date of Patent: Mar. 19, 2024

(54) TRANSFERRABLE LIGHT-TRANSMISSIVE ELECTRODE FILMS FOR ELECTRO-OPTIC DEVICES

(71) Applicant: E INK CORPORATION, Billerica, MA (US)

(72) Inventors: Nishit Murari, Billerica, MA (US); Jay William Anseth, Canton, MA (US)

(73) Assignee: E Ink Corporation, Billerica, MA (US)

( * ) Notice: Subject to any disclaimer, the term of this patent is extended or adjusted under 35 U.S.C. 154(b) by 463 days.

(21) Appl. No.: 17/113,339

(22) Filed: Dec. 7, 2020

(65) Prior Publication Data

US 2021/0191224 A1 Jun. 24, 2021

Related U.S. Application Data

(60) Provisional application No. 62/952,600, filed on Dec. 23, 2019.

(51) Int. Cl.
*G02F 1/167* (2019.01)
*G02F 1/16757* (2019.01)
*G02F 1/1676* (2019.01)

(52) U.S. Cl.
CPC .......... *G02F 1/167* (2013.01); *G02F 1/16757* (2019.01); *G02F 1/1676* (2019.01)

(58) Field of Classification Search
CPC .... G02F 1/167; G02F 2202/28; G02F 1/1676; G02F 1/1681; G02F 1/16757; G02F 1/1679; G02F 1/161; G02F 1/157; G02F 1/1533; G02F 2001/1678; G02F 1/16756; G02F 1/1677; G02F 1/133305; G02F 1/16766; G02F 1/163; G02F 1/155; G02F 1/13439; G02F 1/16755; G02F 1/133345;
(Continued)

(56) References Cited

U.S. PATENT DOCUMENTS 4,418,346 A 11/1983 Batchelder
5,760,761 A 6/1998 Sheridon
(Continued)

OTHER PUBLICATIONS

Korean Intellectual Property Office, International Search Report and Written Opinion, PCT/US2020/063578, dated Apr. 7, 2021.
(Continued)

*Primary Examiner* — Brandi N Thomas
(74) *Attorney, Agent, or Firm* — Ioannis Constantinides (57) ABSTRACT

An electro-optic device, and its method of manufacturing, is disclosed comprises a first substrate layer, a conductive film comprising a first adhesive layer and a first electrode layer, an electro-optic material layer, and a second electrode layer. The first electrode layer, which is on contact with the electro-optic material layer, comprises a conductive material, such as conductive particles, a metallic material or a conductive polymer. The first adhesive layer has high storage modulus and does not exhibit plastic flow under the conditions of manufacturing, storage, and operation of the electro-optic device. The conductive film does not conform to the surface roughness of the first surface of the electro-optic material layer. The conductive film may be designed to be thin, flexible and transparent. The resulting electro-optic device exhibit excellent electro-optic performance even where the electro-optic material layer has imperfections in the form of gaps.

17 Claims, 4 Drawing Sheets

(58) Field of Classification Search
CPC ............ G02F 1/136227; G02F 1/1345; G02F 1/13338; G02F 1/0018; G02F 1/133514; G02F 1/1368; G02F 1/1685; G02F 2201/123; G02F 1/1334; G02F 1/0327; G02F 1/133516; G02F 1/1675; G02F 2202/022; G02F 1/0107; G02F 1/1339; G02F 1/134327; G02F 1/136213; G02F 1/133512; G02F 2201/34; G02F 1/13336; G02F 2201/50; G02F 1/13452; G02F 1/133377; G02F 1/136236; G02F 1/136259; G02F 1/136263; G02F 1/136286; G02F 2202/36; G02F 1/015; G02F 1/0316; G02F 1/035; G02F 1/134309; G02F 1/153; G02F 1/0311; G02F 1/133354; G02F 1/1508; G02F 1/212; G02F 2001/1635; G02F 2203/02; G02F 1/1341; G02F 1/1343; G02F 1/13458; G02F 2201/121; G02F 2201/48; G02F 1/133602; G02F 1/2252; G02F 1/2255; G02F 2201/05; G02F 2201/063; G02F 2201/066; G02F 2201/127; G02F 2202/12; G02F 2203/12; G02F 2203/21; G02F 2203/34; G02F 2203/50; G02F 2203/60; G02F 1/133348; G02F 1/13394; G02F 2203/055; G02F 2203/69; G02F 1/1303; G02F 1/1333; G02F 1/133308; G02F 1/133553; G02F 1/1362; G02F 1/136204; G02F 2202/02; G02F 2202/42; G02F 1/0102; G02F 1/03; G02F 1/13306; G02F 1/133368; G02F 1/1337; G02F 1/134363; G02F 2201/12; G02F 1/13; G02F 1/1309; G02F 1/133; G02F 1/133385; G02F 1/133388; G02F 1/133394; G02F 1/1335; G02F 1/133707; G02F 1/136; G02F 1/136277; G02F 1/1506; G02F 1/1671; G02F 1/16753; G02F 1/16761; G02F 1/225; G02F 1/292; G02F 2201/08; G02F 2201/124; G02F 2202/10; G02F 2202/16; G02F 2203/06; G02F 2203/68; G02F 1/0027; G02F 1/0123; G02F 1/065; G02F 1/13312; G02F 1/133311; G02F 1/133331; G02F 1/133374; G02F 1/133509; G02F 1/133526; G02F 1/133614; G02F 1/133615; G02F 1/133617; G02F 1/13415; G02F 1/134336; G02F 1/13456; G02F 1/13475; G02F 1/13613; G02F 1/136209; G02F 1/136231; G02F 1/13629; G02F 1/1391; G02F 1/1393; G02F 1/1396; G02F 1/141; G02F 1/15; G02F 1/1503; G02F 1/166; G02F 1/16762; G02F 1/195; G02F 1/294; G02F 1/295; G02F 2001/15145; G02F 2001/1518; G02F 2201/086; G02F 2201/122; G02F 2201/38; G02F 2201/465; G02F 2201/52; G02F 2201/56; G02F 2202/023; G02F 2202/025; G02F 2202/046; G02F 2202/32; G02F 2203/01; G02F 2203/023; G02F 2203/03; G09G 3/344; G09G 2330/021; G09G 2300/0857; G09G 2300/0426; G09G 2310/0275; G09G 2320/0214; G09G 3/3446; G09G 2300/04; G09G 2354/00; G09G 2380/04; G09G 3/38; G09G 2310/06; G09G 3/006; G09G 3/34; G09G 2300/0439; G09G 2300/08; G09G 2300/0842; G09G 2310/04; G09G 2300/026; G09G 3/20; G09G 2310/0262; G09G 2320/0252; G09G 2380/02; G09G 2380/06; G09G 3/035; G09G 2300/0804; G09G 2300/0838; G09G 2310/0245; G09G 2310/0278; G09G 2310/0286; G09G 2310/08; G09G 2320/0209; G09G 2320/0219; G09G 2330/023; G09G 3/207; G09G 3/2074; G09G 3/2088; G09G 3/3648; G09G 2310/0221; G09G 2310/0267; G09G 2310/0281; G09G 3/3607; G09G 2300/0866; G09G 2310/0251; G09G 2310/061; G09G 2310/062; G09G 2310/068; G09G 2320/0693; G09G 3/2003; G09G 3/2007; G09G 3/30; G09G 3/3453; G09G 3/3611; G09G 3/3688; G09G 2300/0417; G09G 2300/0452; G09G 2300/06; G09G 2300/0819; G09G 2300/0871; G09G 2300/0876; G09G 2310/0218; G09G 2310/0256; G09G 2310/0272; G09G 2320/02; G09G 2320/0257; G09G 2320/041; G09G 2320/043; G09G 2320/045; G09G 2320/103; G09G 2330/028; G09G 2330/04; G09G 2340/16; G09G 2370/08; G09G 3/16; G09G 3/2022; G09G 3/3208; G09G 3/3233; G09G 3/3258; G09G 3/3266; G09G 3/3275; G09G 3/3291; G09G 3/3674; G09G 3/3685; G02B 26/026; G02B 23/2407; G02B 26/02; G02B 5/0808; G02B 6/122; G02B 2207/123; G02B 5/201; G02B 21/00; G02B 21/0032; G02B 30/27; G02B 6/4214; G02B 6/43; G02B 1/14; G02B 2006/12035; G02B 2006/12142; G02B 3/00; G02B 3/0012; G02B 3/0031; G02B 3/0056; G02B 5/206; G02B 6/0065; G02B 6/0086; G02B 6/0093; G02B 6/10; G02B 6/12; G02B 6/12002; G02B 6/13; G02B 6/132; G02B 6/24; G02B 6/30; G02B 6/42; G02B 6/4226; G02B 6/4239; H01L 27/1214; H01L 27/124; H01L 27/1288; H01L 27/1266; H01L 29/78603; H01L 23/544; H01L 2924/0002; H01L 2224/16225; H01L 27/12; H01L 27/1218; H01L 2221/68368; H01L 27/1255; H01L 27/1248; H01L 2924/01005; H01L 2924/01049; H01L 2924/14; H01L 2221/68363; H01L 2224/32225; H01L 21/6835; H01L 2224/48091; H01L 2224/73204; H01L 2224/73265; H01L 2224/83101; H01L 2224/83192; H01L 27/13; H01L 29/66765; H01L 29/78645; H01L 2221/68322; H01L 2221/68381; H01L 2223/54426; H01L 2224/05568; H01L 2224/05573; H01L 2224/45144; H01L 2224/48464; H01L 27/1222; H01L 27/14634; H01L 27/14643; H01L 27/14683; H01L 29/66757; H01L 29/78669; H01L 2924/01046; H01L 2924/01078; H01L 2924/01079; H01L 2924/12041; H01L 31/105; H01L 21/28;

H01L 21/283; H01L 21/30612; H01L 21/568; H01L 21/67092; H01L 21/67259; H01L 21/76251; H01L 21/76804; H01L 21/76816; H01L 21/76831; H01L 21/78; H01L 22/12; H01L 2221/68345; H01L 2221/6835; H01L 2221/68359; H01L 2223/5442; H01L 2223/54473; H01L 2223/5448; H01L 2224/04105; H01L 2224/05147; H01L 2224/05184; H01L 2224/05644; H01L 2224/05647; H01L 2224/18; H01L 2224/24137; H01L 2224/24226; H01L 2224/48227; H01L 2224/73267; H01L 2224/92244; H01L 23/12; H01L 23/48; H01L 23/49866; H01L 23/53233; H01L 23/5389; H01L 24/05; H01L 24/18; H01L 24/19; H01L 24/82; H01L 25/167; H01L 25/18; H01L 27/14627; H01L 27/15; H01L 29/45; H01L 29/78672; H01L 2924/00014; H01L 2924/01004; H01L 2924/01006; H01L 2924/0101; H01L 2924/01013; H01L 2924/01015; H01L 2924/01018; H01L 2924/01023; H01L 2924/01024; H01L 2924/01027; H01L 2924/01029; H01L 2924/0103; H01L 2924/01032; H01L 2924/01033; H01L 2924/01039; H01L 2924/01047; H01L 2924/01074; H01L 2924/01082; H01L 2924/014; H01L 2924/07811; H01L 2924/10253; H01L 2924/10329; H01L 2924/10336; H01L 2924/12043; H01L 2924/12044; H01L 2924/1305; H01L 2924/13091; H01L 2924/15788; H01L 2924/181; H01L 2924/19041; H01L 2924/19043; H01L 2924/30105; H01L 2924/3011; H01L 2924/3025; H01L 2924/3512; H01L 2933/0025; H01L 33/0041; H01L 33/005; H01L 33/0093

See application file for complete search history.

(56) References Cited

U.S. PATENT DOCUMENTS

| | | | |
|---|---|---|---|
| 5,777,782 A | 7/1998 | Sheridon |
| 5,808,783 A | 9/1998 | Crowley |
| 5,872,552 A | 2/1999 | Gordon, II et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,301,038 B1 | 10/2001 | Fitzmaurice et al. |
| 6,866,760 B2 | 3/2005 | Paolini Jr. et al. |
| 6,870,657 B1 | 3/2005 | Fitzmaurice et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,144,942 B2 | 12/2006 | Zang et al. |
| 7,170,670 B2 | 1/2007 | Webber |
| 7,173,752 B2 | 2/2007 | Doshi et al. |
| 7,236,291 B2 | 6/2007 | Kaga et al. |
| 7,312,784 B2 | 12/2007 | Baucom et al. |
| 7,321,459 B2 | 1/2008 | Masuda et al. |
| 7,339,715 B2 | 3/2008 | Webber et al. |
| 7,342,068 B2 | 3/2008 | Klingenberg et al. |
| 7,411,719 B2 | 8/2008 | Paolini, Jr. et al. |
| 7,420,549 B2 | 9/2008 | Jacobson et al. |
| 7,452,828 B2 | 11/2008 | Hirakata et al. |
| 7,453,445 B2 | 11/2008 | Amundson |
| 7,535,624 B2 | 5/2009 | Amundson et al. |
| 7,561,324 B2 | 7/2009 | Duthaler et al. |
| 7,667,886 B2 | 2/2010 | Danner et al. |
| 7,672,040 B2 | 3/2010 | Sohn et al. |
| 7,679,814 B2 | 3/2010 | Paolini, Jr. et al. |
| 7,715,088 B2 | 5/2010 | Liang et al. |
| 7,811,272 B2 | 10/2010 | Lindsay et al. |
| 7,839,564 B2 | 11/2010 | Whitesides et al. |
| 7,843,626 B2 | 11/2010 | Amundson et al. |
| 8,009,348 B2 | 8/2011 | Zehner et al. |
| 8,432,607 B2 | 4/2013 | Yu et al. |
| 8,611,000 B2 | 12/2013 | Komatsu et al. |
| 8,741,434 B2 | 6/2014 | Han et al. |
| 9,279,906 B2 | 3/2016 | Kang |
| 9,777,201 B2 | 10/2017 | Widger et al. |
| 9,835,925 B1 | 12/2017 | Bull et al. |
| 10,444,553 B2 | 10/2019 | Laxton |
| 2005/0272214 A1* | 12/2005 | Chiang ............ H01M 10/0436 257/273 |
| 2006/0188721 A1 | 8/2006 | Irvin et al. |
| 2007/0211331 A1* | 9/2007 | Danner .................. G02F 1/167 359/296 |
| 2011/0026099 A1* | 2/2011 | Kwon ............... G02F 1/133516 445/24 |
| 2011/0080633 A1* | 4/2011 | Yamamoto .......... G02F 1/16757 445/24 |
| 2015/0005720 A1 | 1/2015 | Zang |
| 2015/0243405 A1 | 8/2015 | Kai et al. |
| 2016/0012710 A1 | 1/2016 | Lu et al. |
| 2016/0136930 A1* | 5/2016 | Gregard ............ B32B 17/10871 359/275 |
| 2017/0351155 A1 | 12/2017 | Paolini, Jr. et al. |
| 2018/0210310 A1* | 7/2018 | Telfer .................. G02F 1/13439 |

OTHER PUBLICATIONS

Wood, D., "An Electrochromic Renaissance?" Information Display, 18(3), Mar. 24, 2002.

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

* cited by examiner

TRANSFERRABLE LIGHT-TRANSMISSIVE ELECTRODE FILMS FOR ELECTRO-OPTIC DEVICES

RELATED APPLICATIONS

This application claims priority to U.S. Provisional Patent Application No. 62/952,600 filed on Dec. 23, 2019, which is incorporated by reference in its entirety, along with all other patents and patent applications disclosed herein.

BACKGROUND OF INVENTION

This invention relates to electro-optic devices and to materials for use therein. More specifically, this invention relates to an electro-optic device having improved electro-optic performance. The electro-optic device comprises a conductive film comprising a first adhesive layer and a first electrode layer, wherein the first electrode layer comprises a conductive material selected from the group consisting of conductive particles, a metallic material and a conductive polymer. The invention also relates to a method of manufacturing of an electro-optic device. The present invention is especially, though not exclusively, intended for use in displays containing encapsulated electrophoretic media.

The term "electro-optic", as applied to a material, a display, or a device, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme, which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728; 7,679,814;

(b) Capsules, binders and encapsulation processes; see for example U.S. Pat. Nos. 6,922,276; 7,411,719; and U.S. Patent Applications Publication Nos. US2017/0251155;

(c) Microcell structures, wall materials, and methods of forming microcells; see for example U.S. Pat. Nos. 7,072,095; 9,279,906;

(d) Methods for filling and sealing microcells; see for example U.S. Pat. Nos. 7,144,942; 7,715,088;

(e) Films and sub-assemblies containing electro-optic materials; see for example U.S. Pat. Nos. 6,982,178; 7,839,564; and 9,835,925;

(f) Backplanes, adhesive layers and other auxiliary layers and methods used in displays; see for example U.S. Pat. Nos. 7,116,318; 7,535,624; 7,672,040; 7,173,752; 7,342,068; and International Application Publication No. WO 2007/121104;

(g) Color formation and color adjustment; see for example U.S. Pat. Nos. 7,075,502; 7,839,564;

(h) Methods for driving displays; see for example U.S. Pat. Nos. 7,012,600; 7,453,445;

(i) Applications of displays; see for example U.S. Pat. Nos. 7,312,784; 8,009,348; and (j) Non-electrophoretic displays, as described in U.S. Pat. No. 6,241,921; and U.S. Patent Application Publication No. 2015/0277160; and applications of encapsulation and microcell technology other than displays; see for example United States Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules, even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques. Thus, the resulting display can be flexible. Further, because the display medium can be printed (using a variety of methods), the display itself can be made inexpensively.

Other types of electro-optic materials may also be used in the present invention. Of particular interest, bistable ferroelectric liquid crystal displays (FLC's) are known in the art.

An electro-optic device may typically comprise a plurality of functional layers, including, but not limited to, a front electrode, an electro-optic material layer, and a back electrode. For example, in some electrophoretic displays, the electro-optic material layer may include a plurality of capsules that are distributed in a binder. In most such devices, both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The manufacture of a three-layer electrophoretic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. A very similar process can be used to prepare an electrophoretic display usable with a stylus or similar movable electrode by replacing the backplane with a simple protective layer, such as a plastic film, over which the stylus or other movable electrode can slide. In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically conductive layer; a layer of a solid electro-optic medium in electrical contact with the electrically conductive layer; an adhesive layer; and a release sheet. Typically, the light-transmissive electrically conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 μm), preferably about 2 to about 10 mil (51 to 254 μm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington DE, and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well adapted to mass production since the front plane laminate may be mass-produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

The aforementioned 2007/0109219 also describes various methods designed for high volume manufacture of electro-optic displays using inverted front plane laminates; preferred forms of these methods are "multi-up" methods designed to allow lamination of components for a plurality of electro-optic displays at one time.

In the processes described above, the lamination of the substrate carrying the electro-optic layer to the backplane may advantageously be carried out by vacuum lamination. Vacuum lamination is effective in expelling air from between the two materials being laminated, thus avoiding unwanted air bubbles in the final display; such air bubbles may introduce undesirable artifacts in the images produced on the display.

The front electrode of a typical electro-optic devices comprises a continuous film of Indium Tin Oxide (ITO), which is in electrical contact with the electro-optic material layer. In many cases, an adhesive layer is interposed between the front and back electrode within the electro-optic device. The interposition of the adhesive layer improves the mechanical stability of the device, but it may also (a) increase the cost of manufacturing, (b) increase the required voltage and energy consumption to drive the device, (c) decrease the operational temperature range, and (d) decrease the switching speed. Thus, there is a need for the development of electro-optic devices with improved performance. The invention of the present patent application avoids the above-mentioned drawbacks by eliminating the need for an adhesive layer between the front electrode and back electrode of the electro-optic device. The invention also enables the construction of flexible electro-optic devices having a thin, flexible and light-transmissive front electrode. In addition, the invention enables the preservation of good electro-optic performance of an electro-optic device even in the case of coating defects or voids in the electro-optic material layer.

SUMMARY

Accordingly, in one aspect, this invention provides an electro-optic device comprising a first substrate layer, a conductive film comprising a first adhesive layer and a first electrode layer, an electro-optic material layer, and a second electrode layer. The first electrode layer comprises a conductive material and has a first surface and second surface. The electro-optic material layer has a first surface and a second surface. The first surface of the first electrode layer is in contact with the first adhesive layer. The second surface of the first electrode layer is in contact with the first surface of the electro-optic material layer. The conductive film may be light-transmissive. The conductive film may be flexible. The conductive film does not conform to the surface roughness of the first surface of the electro-optic material layer. The first adhesive layer of the conductive film may have a storage modulus G' of at least $10^4$ Pa measured at frequency of $10^{-3}$ Hz and temperature of 70° C. The first substrate layer, the conductive film, the electro-optic material layer, and the second electrode layer of the electro-optic device may be arranged in this order. The first substrate layer may be a first release film. The electro-optic device may also comprise a second substrate layer, wherein the second electrode layer is interposed between the electro-optic material layer and the second substrate layer. The second substrate layer may be a second release sheet, which is attached to the second electrode via a second adhesive layer. The second electrode layer may comprise one electrode or a plurality of electrodes. The plurality of electrodes is also called pixel electrodes. The electro-optic device may be flexible.

The first electrode layer of the electro-optic device may comprise a metallic material, a conductive polymer, conductive particles, or combinations thereof. The conductive particles may be conductive carbon black, single walled carbon nanotubes, multiple walled carbon nanotubes, graphene, conductive metal oxide particles or combinations thereof. The metallic material may comprise metal particles, metal nanoparticles, metal wires, metal nanowires, metal fibers, metal nanofibers, metal flakes, metal disks or combinations thereof.

The electro-optic material layer of the electro-optic device may comprise an encapsulated electrophoretic medium including an internal phase, comprising a nonpolar liquid and a plurality of dispersed charged pigment particles, and a polymeric binder. The electrophoretic medium may be encapsulated in a plurality of capsules having an average capsule diameter of from about 30 μm to about 120 μm.

In another aspect, the invention provides a method of manufacturing of an electro-optic device comprising the steps of (1) preparing a conductive sheet comprising a first electrode layer by (a) coating a conductive dispersion comprising a conductive material onto a first release sheet, and (b) drying the conductive dispersion to produce a first electrode layer on the first release sheet; (2) preparing a substrate sheet by (a) coating a first adhesive composition onto a first substrate layer and (b) drying or curing the first adhesive composition to form a first adhesive layer; (3) preparing a conductive web by transferring the conductive sheet onto the substrate sheet, wherein the first electrode layer of the conductive sheet is in contact with the first adhesive layer of the substrate sheet, and wherein the first adhesive layer and the first electrode layer make up a conductive film; (4) preparing an electro-optic module precursor by coating an electro-optic medium onto a second electrode layer to form an electro-optic material layer on the second electrode layer; (5) contacting the first electrode layer of the conductive web with the electro-optic material layer of the electro-optic module precursor, wherein the conductive film of the electro-optic device does not conform to the surface roughness of the electro-optic material layer. The conductive sheet may be light-transmissive. The % total light transmittance of the conductive sheet may be higher than 60%, or higher than 70%, or higher than 80%, or higher than 90%, or higher than 95%. The conductive sheet may be flexible. The first adhesive layer of the conductive film may have a storage modulus G' of at least $10^4$ Pa measured at frequency of $10^{-3}$ Hz and temperature of 70° C.

In another aspect, the invention provides a method of manufacturing of an electro-optic device comprising the steps of (1) preparing a substrate sheet by (a) coating a first adhesive composition on a first substrate layer and (b) drying or curing the first adhesive composition to form a first adhesive layer on the first substrate layer; (2) preparing a conductive tape by (a) coating a conductive dispersion comprising a conductive material onto the first adhesive layer, and (b) drying the conductive dispersion to form a first electrode layer, wherein the first electrode layer and the first adhesive layer make up an adhesive film; (3) preparing an electro-optic module precursor by coating an electro-optic medium onto a second electrode layer to form an electro-optic material layer on the second electrode layer; (4) contacting the first electrode layer of the conductive tape with the electro-optic material layer of the electro-optic module precursor, wherein the conductive film does not conform to the surface roughness of the electro-optic material layer. The conductive tape is light-transmissive. The conductive film may be flexible. The % total light transmittance of the conductive tape may be higher than 60%, or higher than 70%, or higher than 80%, or higher than 90%, or higher than 95%. The first adhesive layer of the conductive film may have a storage modulus G' of at least $10^4$ Pa measured at frequency of $10^{-3}$ Hz and temperature of 70° C.

DETAILED DESCRIPTION

As used herein, the term "conductive" is synonymous to "electrically-conductive" and not necessarily to other types of conductivity, such as thermally conductive or magnetically conductive, etc., unless otherwise stated.

As used herein, the term "in contact" with respect to two layer means that a location of a surface of one of the layers is within a distance of 10 nm of a location of the surface of the other layer. The two layers "in contact" may also have a volume wherein a material that forms one layer penetrate into the other layer.

As used herein, the term "substantially planar" with respect to a layer surface means that all points of the surface fall within the same plane or within a distance of less than 10 µm from a plane.

As used herein, the term "does not conform to the surface roughness" with respect to a layer A not conforming to the surface of a layer B means that, under the conditions of the manufacturing, storage, and operation of the electro-optic device, layer A will only conform to occupy less than 30% of the volume of the roughness of the surface of layer B for roughness gaps that have depth of more than 10 µm. Depth is the dimension from the surface of the layer vertically from the surface.

The term "flexible" is used herein consistently with its normal meaning in the display art to refer to a device which is capable of being bent repeatedly without macroscopic damage to the display.

The % total light transmittance of a film or a layer or a sheet is the ratio of total energy of transmitted light from the film or layer to the energy of the incident light×100. The % total light transmittance is measured with standard method ISO 13468 using D65 illuminant using a spectrophotometer.

As used herein, "molecular weight" refers to weight average molecular weight, unless otherwise stated. Molecular weight is measured using industry standard size exclusion column chromatography.

The storage modulus values of adhesive layers provided herein are measured via the Storage Modulus Measurement Method described in the Examples section.

In one aspect, the present invention provides an electro-optic device that comprises a first substrate layer, a conductive film comprising a first adhesive layer and a first electrode layer, an electro-optic material layer, and a second electrode layer.

The first electrode layer comprises a conductive material and has a first surface and a second surface. The electro-optic material layer has a first surface and a second surface. The electro-optic material layer may comprise a plurality of microcapsules or a plurality of microcells. The first surface of the first electrode layer is in contact with the first adhesive layer; the second surface of the first electrode layer is in contact with the electro-optic material layer. The second surface of the electro-optic material layer is in contact with a second electrode layer. The electro-optic device may also comprise a second substrate layer, wherein the second electrode layer is interposed between the electro-optic material layer and the second substrate. The first adhesive layer of the conductive film may have a storage modulus G' of at least $10^4$ Pa measured at frequency of $10^{-3}$ Hz and temperature of 70° C., more preferably $3 \times 10^4$ Pa, even more preferably $5 \times 10^4$ Pa. This contributes to the fact that the conductive film does not conform to the surface roughness of the first surface of the electro-optic material layer. As a result, a good electro-optic performance of the electro-optic device is preserved even in cases of defects or voids (pinholes) at certain locations of the electro-optic material layer. If the conductive film were conforming to the gaps of the first surface of the electro-optic material layer, the first electrode layer could be in electrical connection with the second electrode layer. In this case, there would be a short in the circuit at the location of the gap, leading to a non-optimal electro-optic performance.

The first substrate layer may be a first release sheet. The second substrate may also be a second release sheet, which may be attached to the second electrode via a second adhesive layer. This may be particularly helpful because the release sheet may be removed and the device may be attached to any of a variety of substrates or components.

In one embodiment, the electro-optic device comprises layers that are vertically stacked upon each other and the layers have planar surfaces. Examples of such devices are two-dimensional devices, such as e readers, computer screens, mobile phone screens, etc. In this embodiment, the conductive film is substantially planar and it does not conform to the non-planar defects of the electro-optic material layer.

Another aspect of the present invention involves methods of manufacturing of an electro-optic device. In one embodiment, the method of manufacturing comprises a transfer step which of a first electrode layer onto a first adhesive layer. The first electrode layer and the first adhesive layer make up a conductive film. The produced structure, which also comprises a first release sheet, is contacted, after the removal of the first release sheet, with an electro-optic module precursor comprising an electro-optic material layer and a second electrode layer. This method involves a lamination process.

In another embodiment, the method of manufacturing comprises a step of coating of a first electrode layer onto a first adhesive layer. The produced conductive film is contacted with an electro-optic module precursor comprising an electro-optic material layer and a second electrode layer to complete the manufacturing of the electro-optic device. This method involves multiple coating steps.

The conductive film may be light-transmissive. The % total light transmittance of the conductive film may be higher than 60%, or higher than 70%, or higher than 80%, or higher than 90%, or higher than 95%. The conductive film may also be flexible.

Figure 1:
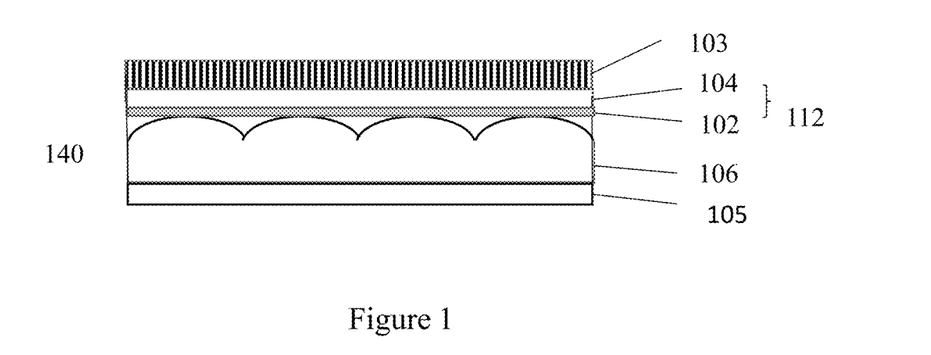
FIG. 1 illustrates an embodiment of an electro-optic device comprising a first substrate layer, a conductive film comprising first adhesive layer and a first electrode layer, an electro-optic material layer, and a second electrode layer.

An example of an embodiment of the inventive electro-optic device is provided in FIG. 1. The electro-optic device 140 of FIG. 1 comprises a first substrate layer 103, a conductive film 112 comprising a first adhesive layer 104 and a first electrode layer 102. The first electrode layer 102 is in contact with an electro-optic material layer 106, which is in contact with the second electrode layer 105.

Figure 2:
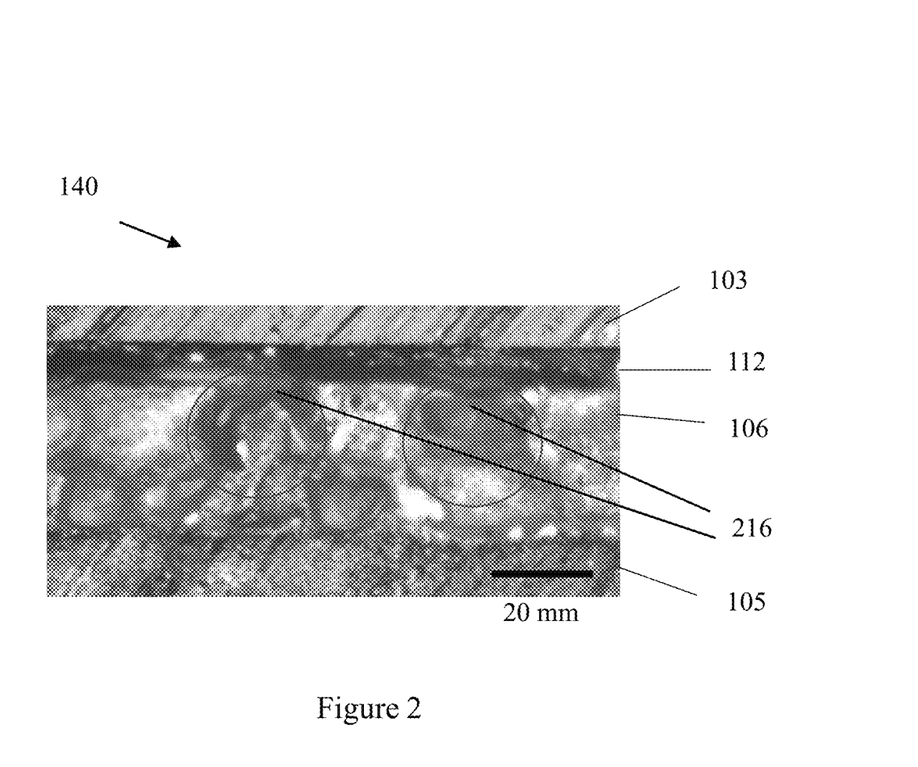
FIG. 2 is a microphotograph of an embodiment of an electro-optic device constructed using the methods of the invention.

A microphotograph of a vertical cross-section of an electro-optic device of the present invention is provided in FIG. 2. The electro-optic device 140 comprises a first substrate layer 103, a conductive film 112, an electro-optic material layer 106, and a second electrode layer 105. The darker colored areas of the electro-optic material layer 216 (circled) correspond to gaps that are located close to its first surface. The electro-optic device was sliced using a razor and a microphotograph of the vertical cross section was acquired. The microphotograph shows that the second surface of the conductive film 112 does not conform to the first surface roughness of the electro-optic material layer.

Figure 3A:
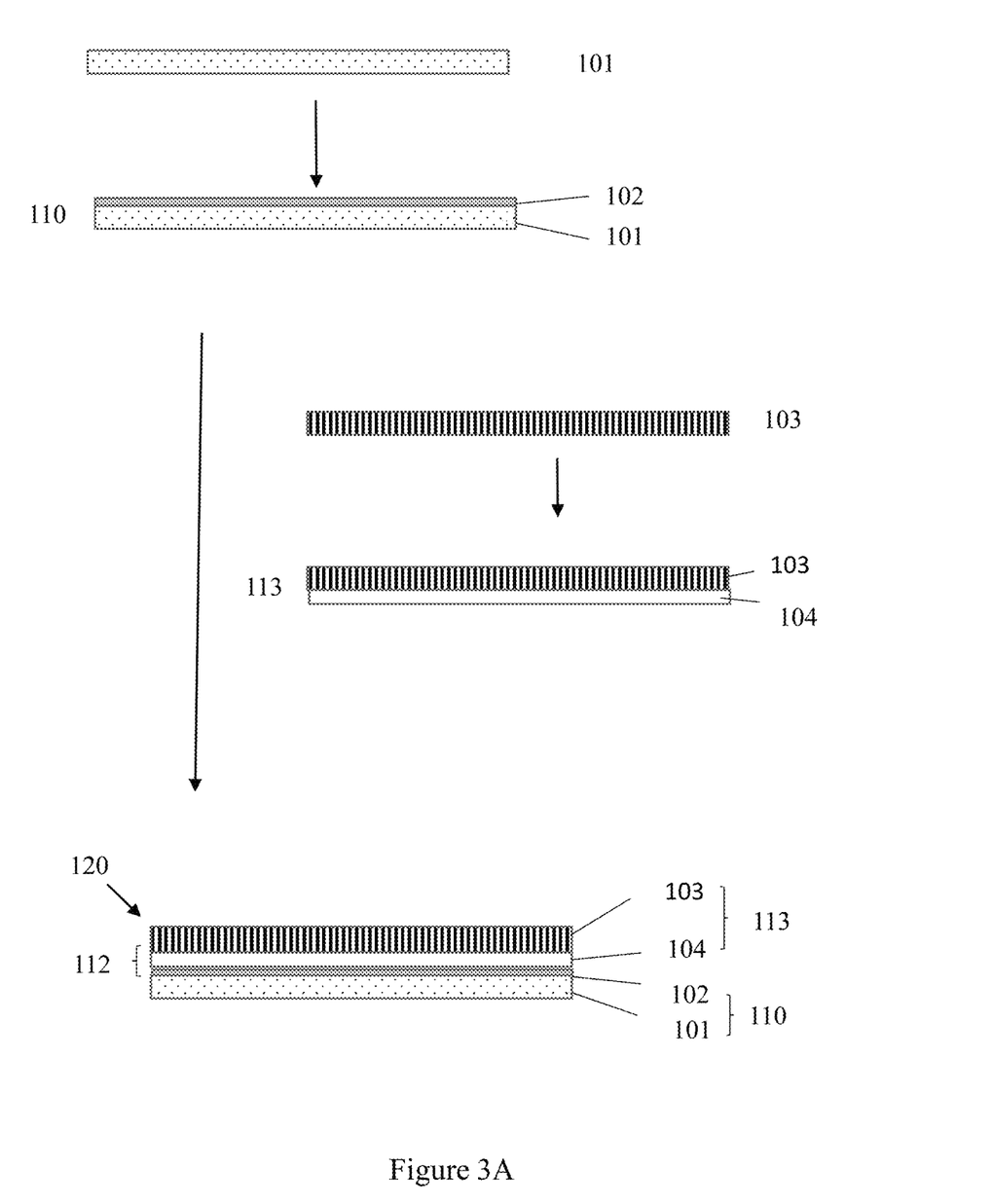
FIGS. 3A and 3B provide an illustration of an example of a process of manufacturing of the inventive electro-optic device using a transfer step of the conductive film onto the electro-optical material layer.
Figure 3B:
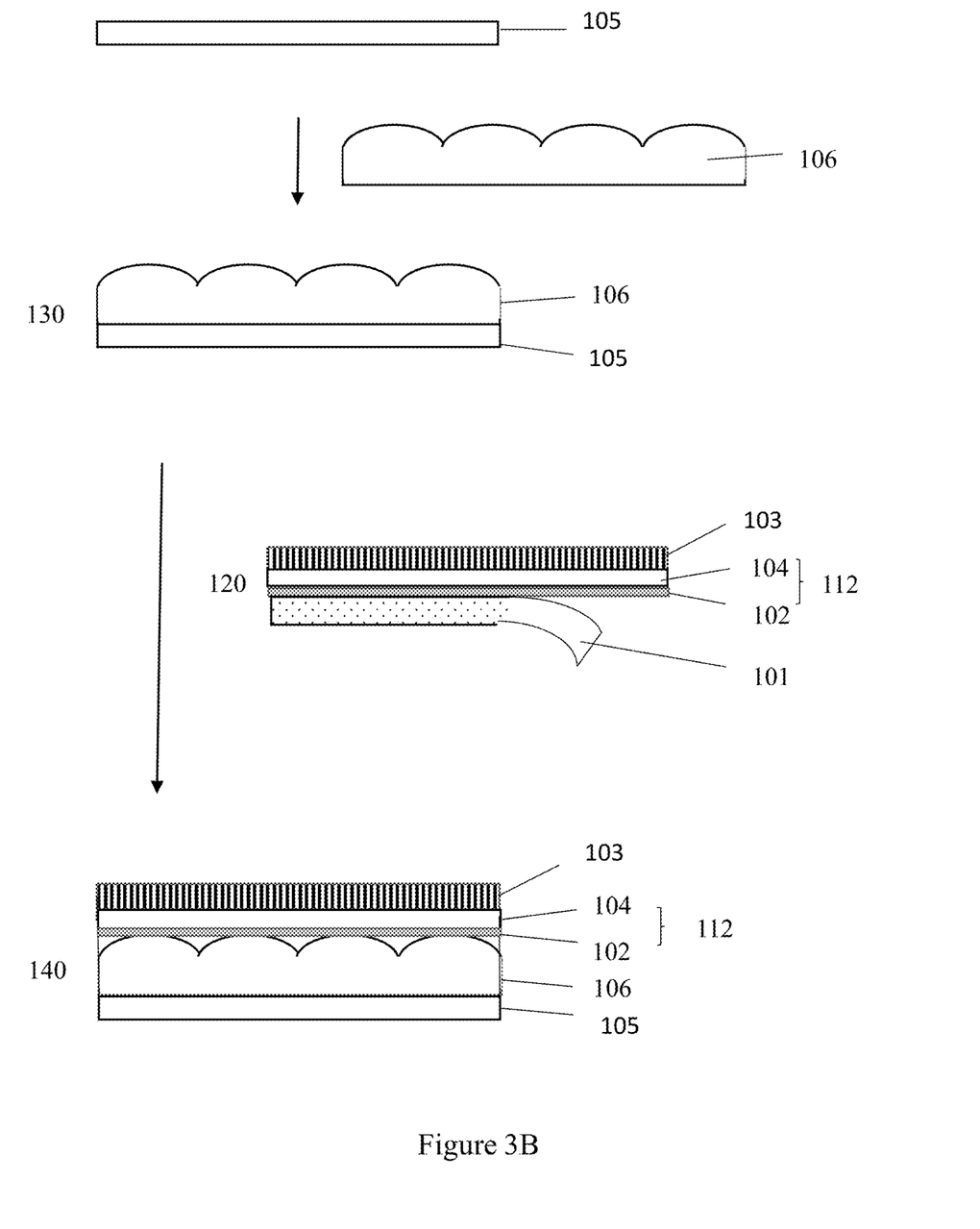

An example of a method of manufacturing of an inventive electro-optic device 140 is illustrated in FIGS. 3A and 3B. More specifically, the method comprises a step of a preparation of a conductive sheet 110 by coating a conductive dispersion onto a first release sheet 101. The conductive dispersion comprises a conductive material and a carrier. After drying of the conductive dispersion, a first electrode layer 102 is formed on the first release sheet 101, completing the preparation of the conductive sheet 110. The method also comprises a step of a preparation of a substrate sheet 113 by coating a first adhesive composition on a first substrate layer 103. Drying or curing of the first adhesive composition completes the preparation of the substrate sheet 113, comprising a first adhesive layer 104. Connection of the conductive sheet 110 with the substrate sheet 113 forms a conductive web 120. This is achieved by contacting the first electrode layer 102 of the conductive sheet 110 with the first adhesive layer 104 of the substrate sheet. Thus, the conductive web 120 comprises in order a first substrate layer 103, a first adhesive layer 104, a first electrode layer 102, and a first release sheet 101. The first adhesive layer and the first electrode layer make up a conductive film 112. The method of manufacturing also comprises a step of a preparation of an electro-optic module precursor 130. This is achieved by coating an electro-optic medium onto a second electrode 105. The electro-optic device 140 is finally formed by removing the first release sheet 101 from the conductive web 120 and by contacting the exposed surface of the first electrode layer 102 of the conductive web 120 with the electro-optic material layer 106 of the electro-optic module precursor 130. The conductive film 112 does not conform to the surface roughness of the electro-optic material layer 106.

Figure 4:
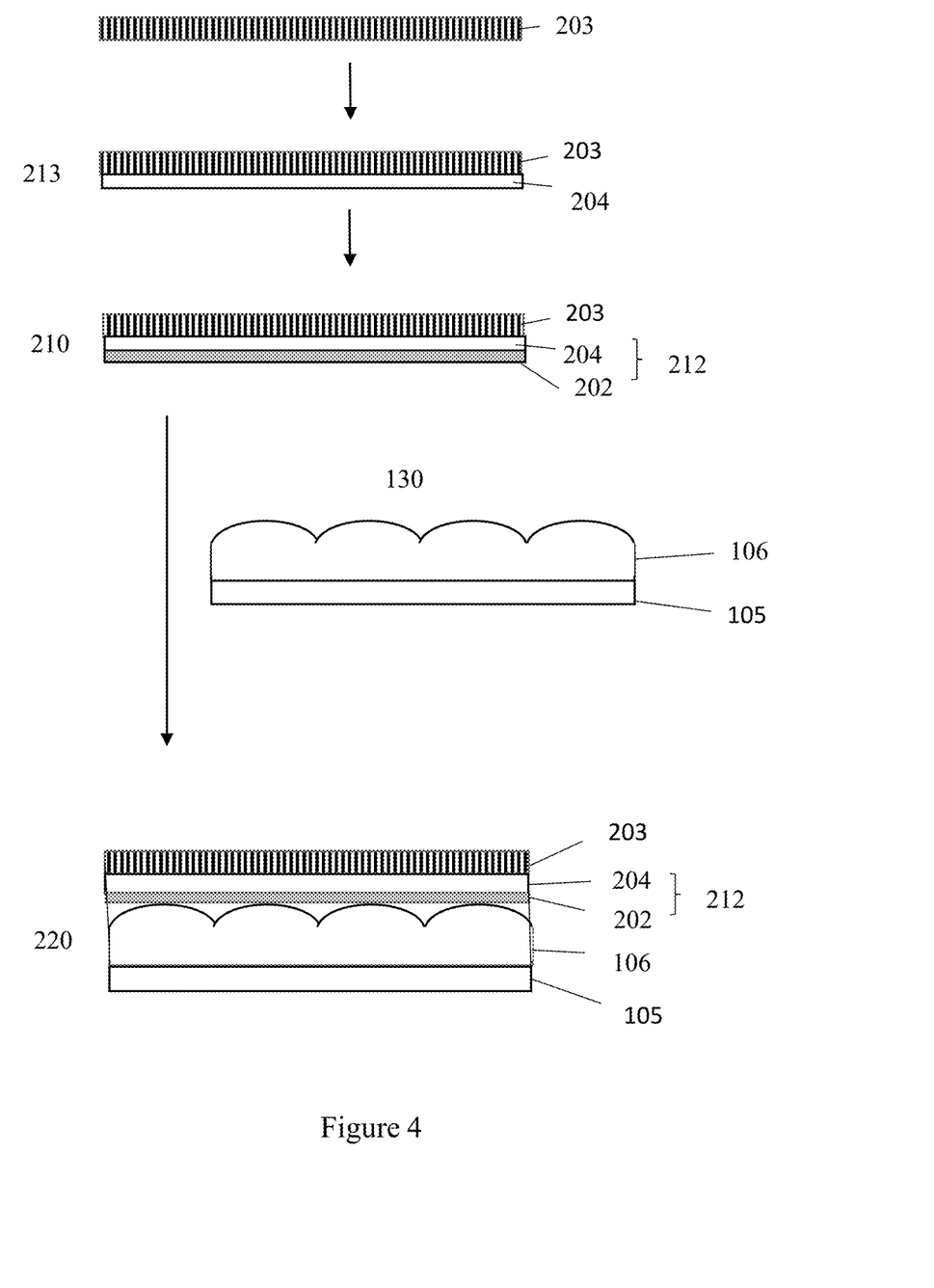
FIG. 4 provides an illustration of an example of a process of manufacturing of the inventive electro-optic device using a coating step of the conductive film on the electro-optical material layer.

Another example of a method of manufacturing of an inventive electro-optic device 140 is illustrated in FIG. 4. More specifically, the method comprises a step of a preparation of a substrate sheet 213 by coating a first adhesive composition onto a first substrate layer 203. Drying or curing of the first adhesive composition completes the preparation of the substrate sheet 213, comprising a first adhesive layer 204. Coating of a conducting dispersion onto the first adhesive layer 204 of the substrate sheet 213 and drying the conductive dispersion forms a first electrode layer 203, completing the preparation of a conductive tape 210. The conductive tape comprises the first substrate layer 203, the first adhesive layer 204 and the first electrode layer 202. The first adhesive layer 204 and the first electrode layer 202 make up conductive film 212. The method of manufacturing also comprises a step of a preparation of an electro-optic module precursor 130. This is achieved by coating an electro-optic medium onto a second electrode 105. The electro-optic device 220 is finally formed by contacting the first electrode layer 203 of the conductive tape 210 with the electro-optic material layer 106 of the electro-optic module precursor 130. The conductive film 212 is in contact with the electro-optic material layer 106. The conductive film 212 does not conform to the surface roughness of the electro-optic material layer 106.

The fact the conductive film of the does not conform to the surface roughness of the first surface of the electro-optic material layer means that the conductive film does not undergo significant plastic flow at the conditions of manufacturing, storage and operation of the electro-optic device. The first adhesive layer of the conductive film affects this physical property. Significant plastic flow is not observed if the first adhesive layer has a storage modulus G' of at least $10^4$ Pa measured at frequency of $10^{-3}$ Hz and temperature of 70° C. Preferably, the first adhesive layer has a storage modulus G' of at least $3\times10^4$ Pa, more preferably the first adhesive layer has a storage modulus G' of at least $5\times10^4$ Pa. The storage modulus of adhesive layers are determined using the Storage Modulus Measurement Method, which is described in the Examples section.

The first adhesive layer of the electro-optic device may have thickness of from about 1 µm to about 1 cm, preferably from about 2 µm to about 100 µm, more preferably from about 5 µm to about 25 µm.

The first electrode layer of the electro-optic device may have thickness less than 5 µm, preferably less than 2 µm, more preferably less than 1 µm.

The first electrode layer of the electro-optic material comprises a conductive material. The conductive material may be a metallic material, a conductive polymer, conductive particles, and combinations thereof. Non-limited examples of metallic materials include metal particles, metal nanoparticles, metal wires, metal nanowires, metal fibers, metal nanofibers, metal flakes and metal disks and combinations thereof. The smallest dimension of the metal particles, metal wires, and metal fibers may have be from about 1 µm to about 50 µm. The smallest dimension of the metal nanoparticles, metal nanowires, and metal nanofibers may have be from about 20 nm to about 1 µm. The metal flakes or metal disks may have average thickness of from about 1 nm to about 200 nm, and average diameter of from 100 nm to about 50 µm. The element of the metallic material may be silver, copper, zinc, gold, platinum, cobalt, nickel, iron, manganese, other metals and combinations thereof. Non-limited examples of conductive polymers include PEDOT-PSS, polyacetylene, polyphenylene sulfide, polyphenylene vinylene, and combinations thereof. Conductive particles may include conductive carbon particles or conductive metal oxide particles. Non-limiting examples of conductive carbon particles include conductive carbon black particles, single walled carbon nanotubes, multiple walled carbon nanotubes, and graphene. Non-limiting examples of conductive metal oxide particles include ruthenium oxide particles, iridium oxide particles, platinum oxide particles, strontium ruthenate particles, and lanthanum strontium cobalt oxide particles.

The electro-optic material layer, which is in contact with the first electrode layer, may also be in contact with the first adhesive layer. This provides mechanical integrity of the electro-optic device. The first adhesive composition may penetrate through the first electrode layer during the manufacturing process, as the electrode layer may be porous. Thus, when the conductive film is contacted with the electro-optic material layer, both the first electrode layer and the first adhesive layer of the conductive film may come into contact with the electro-optic material layer.

The first adhesive layer of the electro-optic device may have sufficient adhesive strength to bind other layers of the electro-optic device. In cases where the electro-optic device needs to be flexible, the first adhesive layer may have sufficient flexibility not to introduce defects into the display when the display is flexed.

The first adhesive layer is formed by an adhesive composition. The adhesive composition may comprises a polymer such as polyurethane, polyurea, polycarbonate, polyamide, polyester, polycaprolactone, polivyl alcohol, polyvinyl acetate, polyether, polyvinyl fluoride, polyvinylidene fluoride, polyvinyl butyral, polyvinylpyrrolidone, poly)2-ethyl-2-oxazoline), acrylate polymer, acrylic copolymer, methacrylate polymer, methacrylic copolymer, maleic anhydride copolymer, vinylether copolymer, styrene copolymer, diene copolymer, siloxane copolymer, cellulose derivatives, gum Arabic, alginate, lecithin, polymer derived from aminoacids, and combinations thereof. The adhesive composition may also comprise an oligomer or a monomer or combinations thereof. The oligomer or the monomer may polymerize by drying or curing, using thermal or light energy.

The first adhesive composition may comprise a polymer in water or organic solvent. The first adhesive composition may be a dispersion or a solution of the polymer in water or the organic solvent. The composition may also be free of solvent.

The first adhesive composition may comprise a cross-linked or a non-crosslinked polymer. For example, the first adhesive composition may also comprise non-crosslinked or crosslinked polyurethane. A non-crosslinked polyurethane may become crosslinked during the drying or curing process of the formation of the adhesive layer. For example, a non-crosslinked polyurethane aqueous dispersion may comprise a crosslinking agent, such as N,N-diglycidylaniline, which contains an epoxy functional group. The crosslinking agent may also comprise a tertiary amine. The crosslinking agent may be thermally activated or it may be activated via UV light. Other useful types of crosslinking agents include epoxy ethers of alkyl or cycloalkyl polyols. Specific useful cross-linking agents include 1,4-cyclohexanedimethanol diglycidyl ether, neopentyl glycol diglycidyl ether, O,O,O-triglycidylglycerol and homopolymers and copolymers of glycidyl methacrylate. The concentration of the crosslinking agent in the adhesive composition may be higher than 0.005 weight %, more preferably higher than 0.01 weight % by weight of the adhesive composition. The crosslinking groups may be part of the non-crosslinked polymer of the adhesive composition, which may become crosslinked during the formation of the first adhesive layer.

The first adhesive composition may also comprise a doping agent to adjust the electrical properties, such as volume resistivity of the first adhesive layer, where needed. Doping agents may be inorganic salts, organic salts, ionic polymers, ionic liquids, etc.

The method of manufacturing of the conductive film is fundamentally different from the typical methods disclosed in the art. It can be used to fabricate a conductive film on a variety of substrates, irrespective of its surface energy or roughness. In addition, it can also be used to provide a highly flexible, free-standing, transparent conductive film. Unlike the typical methods disclosed in the art, the inventive conductive film is not manufactured by premixing a conductive material and a polymer. Rather, the first electrode layer is either directly coated or transferred onto the first adhesive layer. The first adhesive layer is still part of the device, but the conductive material, such as a carbon nanotube, is in contact with the electro-optic material without the need of an intervening adhesive layer. Thus, the electro-optic device of the present invention shows excellent electro-optic performance. This contributes to a low driving voltage, to expand the operational temperature range, and to an increased switching speed. Conductive films of the present invention may be used as the electrode layer in both sides of the electro-optic material layer of an electro-optic device. The flexibility of the conductive film and its capability to be free-standing enables its use in flexible devices and in devices that have 3D shapes.

The conductive web, comprising the first release sheet, the first electrode layer, the first adhesive layer, and the first substrate layer, can exist as a free-standing item.

EXAMPLES

Inventive Example 1: An inventive electro-optic device was constructed comprising a substrate layer, a first adhesive layer comprising polyurethane, a first electrode layer, an electrophoretic material layer, and a second electrode. The electro-optic device was prepared according to the following method.

a. Preparation of the polyurethane: The polyurethane of the adhesive composition was prepared according to the method disclosed in U.S. Pat. No. 7,342,068, using $\alpha,\alpha,\alpha,\alpha$-tetramethylxylene diisocyanate and polypropylene oxide) diol (MW of 2000) reagents, n-methylpyrrolidone solvent, dibutyl tin laurate catalyst, dimethylol propionic acid modifier, trimethyl amine neutralizing agent, and 1,6-hexamethylene diamine chain extender.

b. Preparation of the polyurethane dispersion: The aqueous polyurethane polymer dispersion (35% in water) was mixed with diglycidylaniline crosslinking agent. The concentration of the crosslinking agent was 0.02 weight % by weight of the polyurethane dispersion. This is the adhesive composition. It was used for the construction of the adhesive layer of the electro-optic device as described below. The storage modulus was $8\times10^4$ Pa (at frequency of $10^{-3}$ Hz and temperature of 70° C.). The storage modulus of the adhesive film formed by the adhesive composition was also determined using the Storage Modulus Measurement Method, which is described below.

c. Construction of the electro-optic device: A 0.05 weight % dispersion of single walled carbon nanotubes in water was coated onto a first release sheet (Llumalloy) via a Meyer rod #14. The dispersion was dried at a temperature of 60° C. for 30 minutes to form a conductive sheet. The resistance of the film was 3 kOhm/square and its % total light transmittance was 89%, measured with standard method ISO 13468, using BYK haze-gard i spectrophotometer equipped with integrating sphere and D65 illuminant. The adhesive composition prepared in (b) above was coated on a PET substrate using a Meyer rod #70. After air drying of the dispersion, a substrate sheet was formed comprising a film of polyurethane of 32 grams per meter on the PET substrate. The conductive sheet was then contacted with the substrate sheet to form a conductive web. The conductive web, comprising the PET substrate, the first adhesive layer, the first electrode layer, and the first release sheet is very flexible and can be stored as a free-standing item. The conductive web was laminated onto an electro-optic module precursor, comprising an electro-optic material layer and a second electrode layer. The lamination took place at a rate of 0.5 feet per minute, 60 psi pressure and at 250° F. The electro-optic material layer comprises encapsulated internal phase comprising negatively charged black pigment particles and positively charged white pigments in a hydrocarbon carrier. The electro-optic device was heated in an oven at 60° C. for 120 hours in order to crosslink the polymer of the adhesive layer.

Comparative Example 2: A control electro-optic device comprising a first substrate layer, an ITO first electrode layer, an adhesive layer, a electrophoretic material layer as of Example 1, and a second electrode layer.

The resistance between the first electrode layer and the second electrode of the electro-optic devices of Example 1 and Example 2 was measured. The measurement data are provided in Table 1. The data of Table 1 indicate that the resistance of Example 1 is higher than that of Example 2. This is likely to be caused by the fact that the first electrode layer of the electro-optic device of Example 1 does not conform to the first surface of the electro-optic material layer. As a result, the probability of creating a short between the first electrode layer and the second electrode layer is much lower in Example 1 than in Example 2.

The electro-optic devices of Examples 1 and 2 were also driven to their dark state and then to their white state. The reflectance L* value of the white state was measured for both devices and provided in Table 1. The measurements were performed using a PR-650 SpectraScan colorimeter. The L* value has the usual CIE definition $L^*=116(R/R_0)^{1/3}-16$, wherein R is the reflectance and $R_0$ is a standard reflectance value.

TABLE 1

| | Resistance | Reflectance of the White State L* |
|---|---|---|
| Example 1 | 5 MOhms | 65 |
| Comparative Example 2 | 4.2 kOhms | 42 |

The reflectance data of Table 1 indicates that the electro-optic performance of the Inventive electro-optic device of Example 1 shows improve electro-optic performance compared to the Comparative electro-optic device of Example 2.

Storage Modulus Measurement Method: The method of measuring storage modulus of an adhesive layer includes the preparation of the adhesive layer and a dynamic mechanical analysis measurement. More specifically, the first adhesive composition was coated on a metal foil and dried to produce a 51 mm×51 mm square adhesive film having a thickness of about 17 μm. In the cases where crosslinking is desired (the composition comprises a crosslinker), the film was heated at 60° C. for 120 hours. Then, the adhesive film was removed from the metal foil and folded to produce an adhesive layer of approximately 600 μm in thickness. This adhesive layer was then subjected to Dynamic Mechanical Analysis (DMA) using a TA Instruments DMA tester. The sample was subjected to DMA testing at a constant stress of 1000 Pa with an applied strain of 0.01% over a frequency range of $10^{-6}$ Hz to $10^8$ Hz) at a temperature of 70° C.

What is claimed is:

1. An electro-optic device comprising:
    a first substrate layer;
    a conductive film comprising a first adhesive layer and a first electrode layer, wherein the first electrode layer comprises a conductive material and has a first surface and second surface;
    an electro-optic material layer having a first surface and a second surface; and
    a second electrode layer;
    wherein the first surface of the first electrode layer is in contact with the first adhesive layer, wherein the second surface of the first electrode layer is in contact with the first surface of the electro-optic material layer, and
    wherein the conductive film does not conform to the surface roughness of the first surface of the electro-optic material layer, wherein the conductive film is substantially planar, and wherein the first adhesive layer of the conductive film has a storage modulus G' of at least $10^4$ Pa measured at frequency of $10^{-3}$ Hz and temperature of 70° C.

2. The electro-optic device of claim 1, wherein the conductive film is light-transmissive.

3. The electro-optic device of claim 1, wherein the conductive film is flexible.

4. The electro-optic device of claim 1, wherein the electro-optic device is flexible.

5. The electro-optic device of claim 1, wherein the first substrate is a release sheet.

6. The electro-optic device of claim 1, further comprising a second substrate layer, wherein the second electrode layer is interposed between the electro-optical material layer and the second substrate layer.

7. The electro-optic device of claim 6, wherein the second substrate layer is a second release sheet, which is attached to the second electrode via a second adhesive layer.

8. The electro-optic device of claim 1, wherein the first substrate layer, the first adhesive layer, the first electrode layer, the electro-optic material layer, and the second electrode layer are arranged in this order.

9. The electro-optic device of claim 1, wherein the electro-optic material layer comprises a plurality of microcapsules.

10. The electro-optic device of claim 1, wherein the conductive material of the first electrode layer is selected from the group consisting of a conductive polymer, conductive particles, and metallic materials.

11. The electro-optic device of claim 10, wherein the conductive polymer of the first electrode layer is selected from the group consisting of poly(3,4-ethylenedioxythiophene) polystyrene sulfonate (PEDOT-PSS), polyacetylene, polyphenylene sulfide, polyphenylene vinylene and combinations thereof.

12. The electro-optic device of claim 10, wherein the conductive particles of the first electrode layer are selected from the group consisting of conductive carbon black, single walled carbon nanotubes, multiple walled carbon nanotubes, graphene, conductive metal oxide particles and combinations thereof.

13. The electro-optic device of claim 10, wherein the metallic material of the first electrode layer is selected from the group consisting of metal particles, metal nanoparticles, metal wires, metal nanowires, metal fibers, metal nanofibers, metal flakes and metal disks and combinations thereof.

14. The electro-optic device of claim 13, wherein the metal particles, metal nanoparticles, metal wires, metal nanowires, metal fibers, metal nanofibers, metal flakes and metal disks metal comprise a metal element selected from the group consisting of silver, copper, zinc, gold, platinum, cobalt, nickel, iron, manganese, and combinations thereof.

15. The electro-optic device of claim 1, wherein the electro-optic material layer comprises an encapsulated electrophoretic medium including an internal phase comprising a nonpolar liquid and a plurality of dispersed charged pigment particles and a polymeric binder.

16. The electro-optic device of claim 15, wherein the electrophoretic medium is encapsulated in a plurality of capsules having an average capsule diameter of from about 30 μm to about 120 μm.

17. The electro-optic device of claim 1, wherein the first adhesive layer is also in contact with the electro-optic material layer.

* * * * *